Patented Nov. 17, 1942

2,301,971

UNITED STATES PATENT OFFICE 2,301,971

PROCESS OF PRODUCING N-PHENYL 2-AMINO-BUTADIENES 1,3

Walter Reppe and Otto Hecht, Ludwigshafen-on-the-Rhine, and Ernst Gassenmeier, Mannheim, Germany; vested in the Alien Property Custodian No Drawing. Application November 26, 1940, Serial No. 367,298. In Germany December 16, 1939

5 Claims. (Cl. 260—577)

The present invention relates to N-substituted 2-amino-butadienes-1.3 and a process of producing same.

We have found that N-substituted 2-aminobutadienes-1.3 may be obtained by exposing N-substituted 2-aminobutines-3 in the gas phase to elevated temperature. N-substituted 2-aminobutines-3 may be prepared by causing acetylene to react with primary or secondary amines in the liquid phase in the presence of acetylides of copper, silver, gold or mercury, in particular of copper acetylide. The invention is particularly useful for the production of arylsubstituted 2-aminobutadienes-1.3, e. g., N-phenyl or N-methylphenyl-2-aminobutadiene-1.3 and the N-alkyl derivatives thereof.

Depending on the nature of the substituent present in the amino group of 2-aminobutine-3 the isomerization takes place more or less easily. The most favorable reaction conditions, in particular the temperature and the time of exposure, therefore, vary depending on the nature of the starting material. For example, the isomerization of N-phenyl-2-aminobutadiene-1.3 or its phenyl-substitution products may be achieved by heating them for some time at a temperature somewhat above the boiling point (e. g., from 10 to 30° C. above the boiling point), preferably by leading the vapors through an empty tube heated above the boiling point.

Other starting materials require higher temperatures or longer contact periods or both. The time of contact should be so high that at least part of the aminobutine is isomerized while the starting and the final material are not substantially decomposed.

The rate of isomerization may be increased by heating the vaporized starting materials in the presence of catalysts. Bodies having an active surface, such as silicic acid gel, pumice stone or metal oxides or hydroxides, e. g., aluminum oxide, alkali metal hydroxides, alkaline earth metal hydroxides, magnesium oxide, have proved particularly useful. The activity of these catalysts may be increased by the addition of compounds of iron, titanium, chromium, molybdenum, tungsten, uranium or vanadium.

Generally speaking, the most suitable reaction temperatures are within the range of from 200 to 350° C. By passing from 30 to 80 grams of the vaporized 2-aminobutine-3 per hour for each liter of reaction room, the rate of conversion amounts to from 60 to 90 per cent (in the presence of catalysts) or less (in empty reaction vessels).

N-substituted 2-aminobutadienes-1.3 may be used as starting materials for chemical reactions. They are also useful in the copolymerization with other vinyl compounds in order to modify the properties of the polymerization products.

The following example will further illustrate how our invention may be carried out in practice, but the invention is not restricted to this example.

Example 60 grams of vaporous 2-phenylaminobutine-3 per hour per one liter of catalyst are led through an electrically heated tube of porcelain of 75 centimeters length and 2.8 centimeters internal diameter at from 250 to 255° C. The catalyst was prepared by precipitating aluminum hydroxide in the presence of 1 per cent of iron oxide from a colloidal aluminum-iron hydroxide solution obtained according to U. S. P. 2,085,129.

By condensing the vapors emerging from the tube a liquid is obtained from which 2-phenylamino butadiene-1.3 is obtained in a yield of from 70 to 80 per cent by fractional distillation. It boils at 112 to 115° C. under 10 millimeters pressure (mercury gauge).

When subjecting N-methyl-N-phenyl-2-aminobutine-3 to the same process, there is obtained N-methyl-N-phenyl-2-aminobutadiene-1.3 which forms a colorless liquid boiling at 250 to 260° C. under normal and at 120 to 128° C. under 10 millimeters pressure (mercury gauge).

When heating N-ethyl-N-phenyl-2-aminobutine-3 to 260 to 270° C. under otherwise identical conditions, there is obtained N-ethyl-N-phenyl-2-aminobutadiene-1.3 boiling at 125 to 135° C. under 10 millimeters pressure (mercury gauge).

What we claim is:

1. A process for the production of N-phenyl-2-amino butadienes-1.3 which consists in exposing in the gas phase a member of the group consisting of 2-aminobutines-3 substituted in the amino group by a phenyl radicle and 2-aminobutines-3 substituted in the amino group by a phenyl radicle and a lower alkyl radicle to a temperature exceeding 200° C. but below the temperature at which the starting and final material are substantially decomposed.

2. A process for the production of N-phenyl-2-aminobutadienes-1.3 which consists in leading the vapors of a member of the group consisting of 2-aminobutines-3 substituted in the amino group by a phenyl radicle and 2-aminobutines-3 substituted in the amino group by a phenyl radicle and a lower alkyl radicle through a vessel heated to temperatures within the range of 200 to 350° C.

3. A process for the production of N-phenyl-2-aminobutadienes-1.3 which consists in leading the vapors of a member of the group consisting of 2-aminobutines-3 substituted in the amino group by a phenyl radicle and 2-aminobutines-3 substituted in the amino group by a phenyl radicle and a lower alkyl radicle through a vessel heated to temperatures within the range of 200 to 350° C., charged with an active surface catalyst.

4. A process for the production of N-phenyl-2-aminobutadienes-1.3 which consists in leading the vapors of a member of the groups consisting of 2-aminobutines-3 substituted in the amino group by a phenyl radicle and 2-aminobutines-3 substituted in the amino group by a phenyl radicle and a lower alkyl radicle through a vessel heated to temperatures within the range of 200 to 350° C., charged with aluminum oxide.

5. A process for producing N-phenyl-2-aminobutadienes-1.3 which consists in leading vaporized N-phenyl-2-aminobutine-3 through a vessel heated to a temperature within the range of 200 to 350° C.

WALTER REPPE.
OTTO HECHT.
ERNST GASSENMEIER.